United States Patent [19]
Yabuya

[11] Patent Number: 5,671,877
[45] Date of Patent: Sep. 30, 1997

[54] CONTAINER HOLDER DEVICE

[75] Inventor: Shigeru Yabuya, Inuyama, Japan

[73] Assignee: Toyoda Gosei Co., Ltd., Aichi, Japan

[21] Appl. No.: 594,440

[22] Filed: Jan. 31, 1996

[30] Foreign Application Priority Data

Jan. 31, 1995 [JP] Japan ................. 7-014629

[51] Int. Cl.⁶ ........................................... B60R 7/00
[52] U.S. Cl. ..................... 224/282; 224/483; 224/553; 224/926; 248/311.2
[58] Field of Search ..................... 224/926, 483, 224/281, 282, 544, 542, 553; 248/311.2, 313; 297/188.17, 188.16, 188.15

[56] References Cited

U.S. PATENT DOCUMENTS 5,190,259  3/1993  Okazaki ..................... 224/926

FOREIGN PATENT DOCUMENTS

| 57-79033 | 10/1955 | Japan . |
|---|---|---|
| 61-185629 | 11/1986 | Japan . |
| 63-100340 | 6/1988 | Japan . |
| 1-60944 | 4/1989 | Japan . |
| 1-167935 | 11/1989 | Japan . |
| 4-221235 | 4/1992 | Japan . |
| 4-38834 | 4/1992 | Japan . |
| 4-38835 | 4/1992 | Japan . |
| 4-38836 | 4/1992 | Japan . |
| 4-38837 | 4/1992 | Japan . |

Primary Examiner—Linda J. Sholl
Attorney, Agent, or Firm—Cushman Darby & Cushman IP Group of Pillsbury Madison & Sutro LLP

[57] ABSTRACT

A container holder device including a case which is installed in a body of a vehicle, the case having a pair of generally vertical side walls defining a part of a storage chamber. A base is pivotally supported by the case so as to be movable between a stored position and a use position. At least one movable arm has one end supported by the base so as to be movable with respect to the base to contact a periphery of a container when the base and the at least one arm are in the use position. The at least one arm is guided to move from an outside to an inside of at least one of the side walls upon movement of the base from the use position to the stored position so that the at least one arm contacts the at least one wall in the storage position. Urging structure is provided for urging the at least one arm toward the outside of the at least one side wall.

9 Claims, 3 Drawing Sheets

CONTAINER HOLDER DEVICE

CONTAINER HOLDER DEVICE

The priority application, Japanese Patent Application No. 7-14629, filed in Japan on Jan. 31, 1995 is hereby incorporated into the present specification by this reference.

BACKGROUND OF THE INVENTION

1. Field of the Invention

The present invention relates to a container holder device which is installed in vehicles such as buses and passenger cars and which hold containers such as juice cans and paper cups.

2. Description of Related Art

Conventional container holder devices typically comprise a case which is installed in a vehicle body and which has a storage chamber and a tray which is pivotally supported by the case so as to pivot freely. The tray moves between a storing position a use position and has a receiving hole into which the container is inserted vertically.

The above-mentioned conventional container holder device has the following disadvantages: the size of the tray cannot be designed to be larger than the size of the storage chamber, since the tray is stored in the storage chamber of the case. Accordingly, the number of the receiving holes which guide the container is also limited. So even if the device has two receiving holes, the distance between these two receiving holes is narrow so that they easily interfere with each other. Thus, it is inconvenient to use this conventional device.

SUMMARY OF THE INVENTION

It is an object of the present invention to provide a container holder device which has a guiding portion for a container whose size is larger than that of a storage chamber of the case and which is convenient to use.

The present container holder device comprises: a case which is installed in a body of a vehicle and which has side walls defining a part of a storage chamber and which extend vertically; a base which is pivotally supported by the case so as to move between a storing position and a use position; a pair of sliding arms, each having one end supported slidably by the base, which secures containers by contacting the outer periphery of the containers at least in the use condition and which are guided from a position outside of the side walls to a position inside of the side walls by moving the base from the use position to the storing position so that the arms contact the side walls; and an urging means for urging the sliding arms from the inside to the outside of the side walls.

The base has a fixed arm which may contact the outer periphery of the container and together with the sliding arms, the base can secure the periphery of the container. Furthermore, the present container holder device can comprise a cover which can be supported by the case so as to move freely, which closes the base and the sliding arms storing them in the storing position when the cover is closed. The cover becomes a pedestal of the container when the cover is opened.

The present container holder device is moved to the use position by operating the base stored in the storage chamber of the case. By being supported by the base owing to the movement of this base, the sliding arms stop sliding upon contact with the side walls, move together with the base, so that the sliding arms slide along the slide walls and they are released from the side walls. Therefore, the sliding arms slide with respect to the base by the urging force of the urging means and they slide from the inside to the outside of the side walls.

When the fixed arm is employed, a receiving hole of the container is formed by using the fixed arm and a sliding arm. Thus, at the storing position, the sliding arm is regulated by the side walls and it slides toward the direction approaching the fixed arm so that the container receiving hole becomes small. On the contrary, at the use position, the sliding arm is opened and the container receiving hole having enough size to guide the container is formed by the sliding arm and the fixed arm.

By adapting the cover which becomes the pedestal of the container, it becomes easier to support the container. And in the state that the sliding arms are opened, they occupy a larger area as compared with that of the storage chamber so that they are convenient to use. By pushing the sliding arms into the storage chamber by a rotating operation, the sliding arms are closed automatically by being pressed and they are kept in a small storage chamber. Accordingly, the operation is convenient.

BRIEF DESCRIPTION OF THE DRAWINGS

A more complete appreciation of the present invention and many of its advantages will be readily obtained as the same becomes better understood with reference to the following detailed description when considered in connection with the accompanying drawings and detailed specification, all of which forms a part of the disclosure.

DETAILED DESCRIPTION OF THE PRESENTLY PREFERRED EXEMPLARY EMBODIMENTS

Having generally described the present invention, a further understanding can be obtained by reference to the specific preferred embodiments which are provided herein for purposes of illustration only and are not intended to limit the scope of the appended claims.

Figure 1:
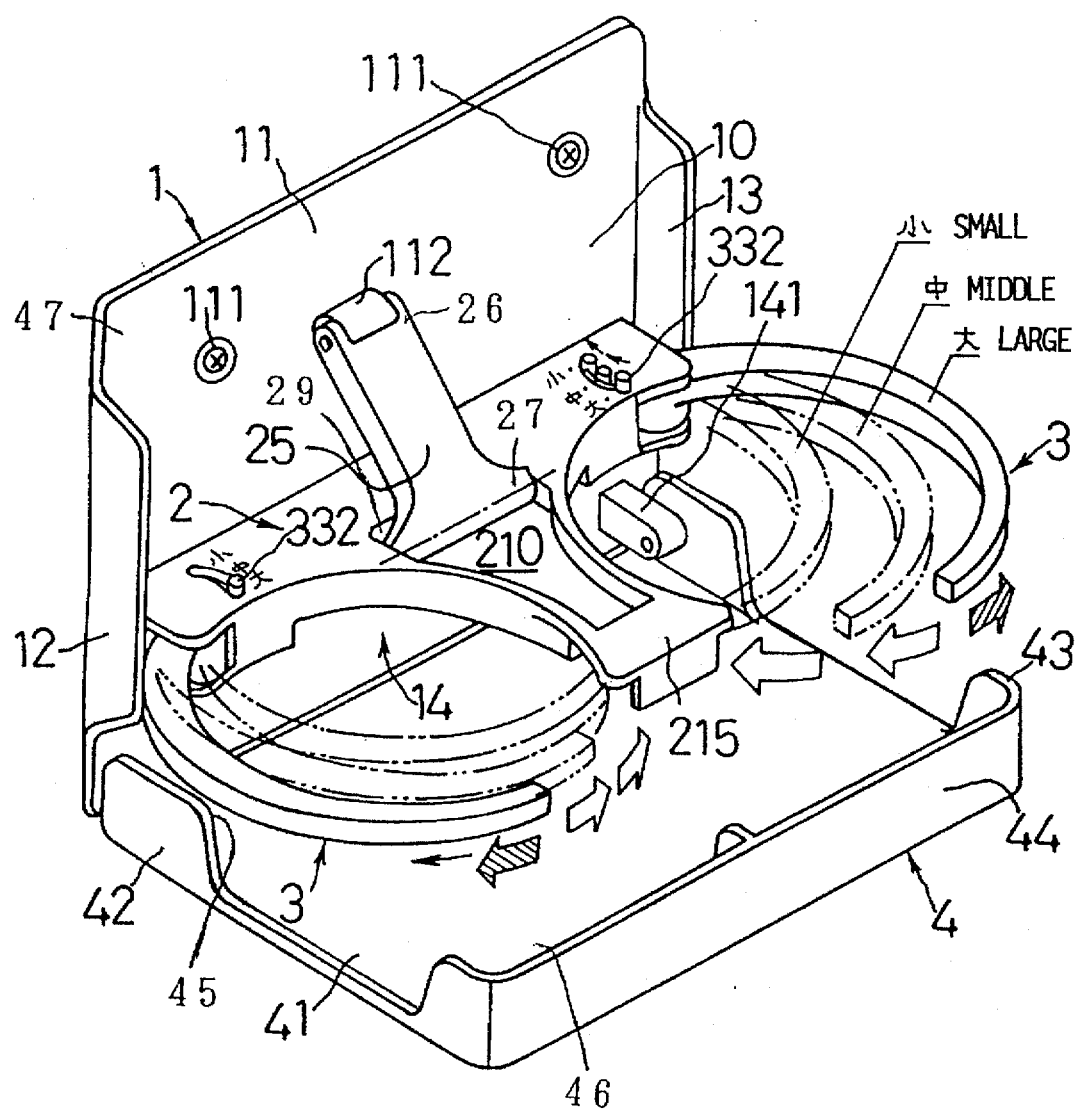
FIG. 1 is a perspective view showing the present container holder device of a preferred embodiment in its use state.

As shown in FIG. 1, which is a perspective view, the present container holder device mainly comprises a case 1, a base 2, a pair of sliding arms 3 and a cover 4.

The case 1 is preferably an injection molded product made of synthetic resin and it comprises: an innermost plate 11; a pair of side plates 12 and 13 which are integrally built-up from both sides of the innermost plate 11; and a bottom plate 14. The case 1 forms a thin storage chamber at the front side of the case 1 whose upper portion and front portion are opened. The side plates 12 and 13 comprise the side walls of the holder device of the present invention. The innermost plate 11 includes: at right and left of the center thereof, a screw 111 for fixing the holder device to the body of a vehicle; and at the center thereof, a bearing portion 112 which projects to the front side of the case 1. The pair of side plates 12 and 13 are formed symmetrically and they are formed in low trapezoid shapes having only center portions, the function of which will become apparent below. The bottom plate 14 includes, at both edges thereof, a bearing portion 141 which projects to the front side of the case 1.

Figure 2:
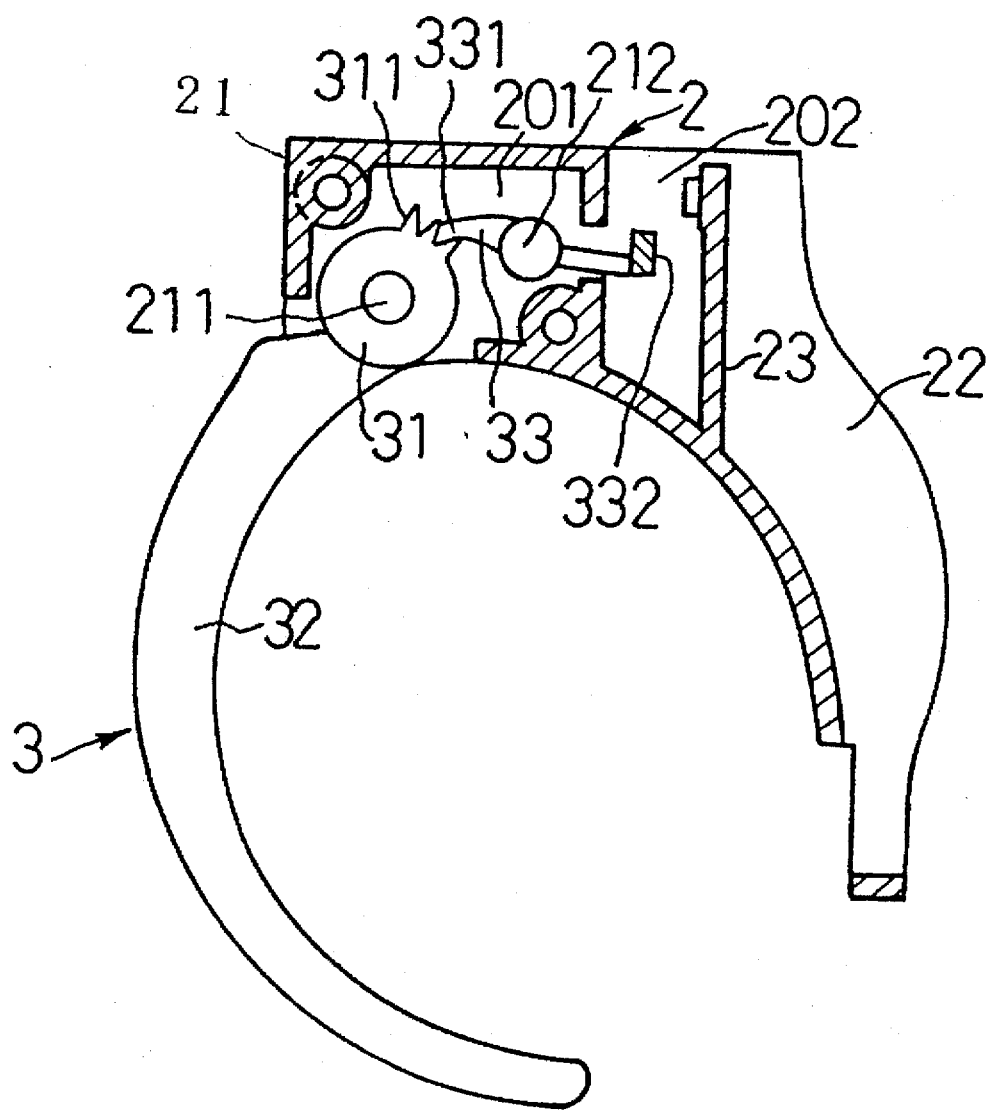
FIG. 2 is an enlarged, partial cross-sectional view showing the main portions of a base and sliding arms of the container holder device of the preferred embodiment.

The base 2 comprises: an upper plate 21 and a lower plate 22 which is fixed by a screw to the upper plate 21. At a reverse face of the upper plate 21, a major part of the side walls 23 are integrally formed and they offer the predetermined thickness to the base 2. By these side walls 23, at the both ends portions which correspond to the bottom of the base 2, gear chambers 201 and operating chambers 202 are respectively formed, as shown in FIG. 2. At each of gear chambers 201, a main shaft 211 and a hook shaft 212 which are integrally formed at the reverse face of the upper plate 21 extend in the direction of the thickness of the base 2. An angled portion 215, to which the front side of the center of the upper plate 21 projects, corresponds to the fixed arm of the present invention. At the center of this angled portion 215, an opening 210, has a width which narrows toward the front side of the device.

As shown in FIG. 1, the base 2 is maintained in position along the innermost plate 11. By rotating the base 2 toward the front side of the device, the base is moved to the horizontal position as shown in FIG. 1. However, by rotating the base toward the opposite direction, it is stored in a storage chamber 10 of the case 1. At the bearing portion 112 of the innermost plate 11 of the case 1, a support 25 is pivotally supported at the bottom end portion 26 thereof through a shaft pin. The upper end portion 27 of the support 25 is inserted into opening 210 of the base 2 from above. When the support 25 rotates ninety degrees, both ends of the upper end portion 27 contact the lower surface of the upper plate 21 of the base 2. As shown in FIG. 1, when the base 2 moves until it is in the horizontal position, the upper end portion 27 of the support 25 contacts the lower wall 29 of the opening 210 so that the base 2 is engaged so as not to slide further via the support 25.

When the base 2 is moved in the opposite direction, the upper end portion of the support 25 moves to the lower side of the upper plate 21 passing through the opening 210 so that the engagement by the support 25 is released.

Each of the sliding arms 3 includes engaging teeth 311 having three teeth at the outer periphery thereof; a shaft portion 31 having a shaft hole at the center thereof; and an arc-shaped arm portion 32 which is integrally formed with these engaging teeth. The shaft hole of each sliding arms 3 is engaged to the main shaft 211 of the base 2 so that the sliding arms are kept by the base 2 so as to slide freely. Between the shaft portion 31 of the sliding arm 3 and the base 2, an urging means in the form of a wound spring (not shown) is provided so that the sliding arms 3 are urged toward a direction which opens them (the clockwise rotation direction shown in FIG. 2). At the hook shaft 212 of the base 2, a hook 33 is engaged and mounted to the base 2 so as to rotate freely. This hook 33 is in bar shape, includes the shaft hole at the center thereof; and at the tip portion of one end portion thereof, a claw 331 and at the other end portion hereof, and an operating edge 332 which projects to the upper side are formed. This operating edge 332 projects upwardly, passing through the arc-shaped opening which is provided at the upper plate 21 of the base 2. Also the hook 33 is urged toward the counterclockwise rotation direction by the wound spring which is provided between the base 2 and the hook. The claw 331 of the hook 33 is engaged to the engaging teeth 311 of the sliding arm 3 and it is prevented from sliding in the direction of opening the sliding arm 3 (clockwise rotation direction). When the sliding arm 3 is moved in the direction of closing of the sliding arm 3, the claw 331 of the hook 33 doesn't bear the engaging effect.

Accordingly, the sliding arm slides in the direction which is opposite to the direction of urging of the hook 33 so that the engaging teeth 311 of the sliding arm 3 are beyond the claw 331 of the hook 33. The engaging teeth and the hook define arm movement regulation means to control the movement of the sliding arms.

In a closed position, the cover 4 and the case 1 are facing each other and as a whole, they form a rectangular and thin box. This cover 4 comprises: a bottom plate 41; side plates 42 and 43 which are built-up from both side edges thereof; and a front plate 44 which is built-up from the front side edge. Both side plates 42 and 43 are formed in shapes lacking the center portions thereof and they are integrally connected with the front plate 44. This cover 4 is mounted with respect to the bearing portion 141 of the bottom plate 14 of the case 1 so as to rotate freely, as shown in FIG. 1. In the opening state, the rear end portion 45 of the bottom plate 41 contacts the bottom plate 14 of the case. When the cover 4 is moved toward the closing direction, the cover 4 pivots around the bearing portion 141 so that the upper end 46 of the bottom plate 41 stops when the upper end 46 of the bottom plate 41 contacts the upper end portion 47 of the innermost plate 11 of the case 1.

This container holder device is operated as follows.

Usually, the cover 4 of this container holder device is in the state of being closed by the case 1. The base 2 and sliding arms 3 are kept in the inside of the storage chamber 10. As shown in FIG. 1, when it is intended that the cover 4 be brought into the state of being used, the front plate 44 of the cover 4 is pushed and it is drawn to the front side of the case 1. By doing this, the cover 4 pivots about the bearing portion 141 to an opened position shown in FIG. 1.

Further, the base 2 and the sliding arms 3 are released from the pressing effect of the cover 4 so that they become free to move. Accordingly, they move toward the front side of the case due to their own weight. When the base 2 moves to the front side of the case, the upper end portion 27 of the support 25 moves upwardly through the opening 210 and also, the support 25 slides in the opposite direction of the base 2. When the base 2 reaches the horizontal position (FIG. 1), the upper end portion 27 of the support 25 contacts the lower wall 29 of the opening 210 so that the base 2 is engaged by the support 25 so as not to slide further.

While in the inside of the storing chamber 10 of the case 1, each of sliding arms is pressed by contacting outer peripheral surfaces of the sliding arms with the inner side surfaces of the side plates 12 and 13. The sliding arms are in the state of coming more close to each other as compared with the state of "small", in which they are closest to each other, shown in FIG. 1. From this position, the sliding arms 3 move to the front side together with the base 2. By this movement, the outer peripheral surfaces of their arms 32 slide on the inner side surface of the side plates 12 and 13 so that they are released from the upper end of the slide plates 12 and 13. Owing to this, by the wound spring which urges the shaft portions 31 of the sliding arms 3 to the direction of opening both of the sliding arms 3, both of the sliding arms 3 are rotated in a direction away from each other. Then, the side surface of the clockwise rotation direction side of the engaging teeth 311, which are in the extreme clockwise rotational direction shown in FIG. 2, and the edge side surface of the claw 331 of the hook 33 contact each other so that the sliding arms are engaged to the hooks 33 and their sliding is stopped. This sliding position is the position shown by "small" in FIG. 1. This "small" position is the position in which the container receiving hole, which is formed by the arm portion 32 of each sliding arms 3 and the angled portion 215 of the base 2, is smallest. Furthermore in this state, the sliding arms 3 further rotate downwardly together with the base 2 and get to the horizontal position shown in FIG. 1. In this position, the upper end portion 27 of the support 25 contacts the lower wall 29 of the opening 210 and by the support 25, the base 2 is engaged so as not to slide any more. In this state, the base, sliding arms are disposed on the upper side of the cover 4 and they are parallel to the cover 4.

In the above-mentioned state, the container holder device of the present preferred embodiment is in a use position.

A container such as a juice can whose outer diameter is small is inserted into the small receiving hole in the position of "small" as it is. And the container is supported by the inner surface of the bottom plate 41 of the cover 4. The outer periphery of the container is held by the angled portion 215 of the base 2 which becomes a fixed arm and the sliding arm 3. Therefore, even if the lateral force is effected to the container, the container is secured by the present container holder device.

When the outer diameter of the container is large, the operating edge 332 of the hook 33 is drawn to the location marked "large". By doing this, the claw 331 of the hook 33 is released from the engaging teeth 311 of the sliding arm 3 so that by the urging force of the wound spring, the sliding arm 3 moves away from the angled portion 215 which becomes the fixed arm and moves in the direction to enlarge the receiving hole. By detaching the operating edge 332 at the position of having the appropriate size of the receiving hole, the claw 331 of the hook 33 is engaged to the different engaging teeth 311 of the sliding arm 3 so that the sliding of the sliding arm 3 is stopped. When the timing of detaching the operating edge 332 is late, by pushing the sliding arm 3 to the angled portion 215 which becomes the fixed arm using fingers, the engagement of the engaging tooth 311 and the claw 331 is released and then the next engaging tooth is engaged to the claw. Therefore, in response to the outer diameter of the container which is inserted into the receiving hole, the appropriate size of the receiving hole can be selected.

When it is intended to fold the container holder device when the device is no longer needed, the cover 4 is lifted and rotated so as to move the cover 4 in contact with the upper end 47 of the innermost plate 11. By doing this the container holder device of the present preferred embodiment is folded. By the rotational movement of the cover 4, the bottom plate 41 of the cover 4 contacts with the arm portions 32 of the sliding arms 3 so that they move rotationally, upwardly together with the cover 4. Then the arms 32 gets in contact with the upper end portion of the side plates 12 and 13 and furthermore by the rotational movement of the sliding arms 3, the sliding arms 3 slide in the direction to move closer to each other, against the urging force. And the arms 32 slide on the inner side surface in the state that they are pressed in contact with the inner side surface of the side plates 12 and 13 so that arms 32 are stored in the storage chamber 10.

In the container holder device of the present preferred embodiment, the sliding arms slide on the side walls which form the storage chamber, they are released from the side walls and furthermore, they extend in a direction transverse to the side walls. In the state in which the sliding arms are opened, they occupy a wider area as compared with that of the storage chamber so that it is convenient to use the present container holder device. Moreover, just by rotationally operating the extended sliding arms so as to push them into the case, the sliding arms are automatically pressed and closed so that they can be stored in a small storage chamber. Therefore, the operation is simple and easy. Moreover, in the container holder device of the present preferred embodiment, the opening amount of the sliding arms is set to be variable. Therefore, the size of the receiving hole can be adjusted in response to the outer diameter of the size of the container so that it is possible to hold containers of various sizes more securely.

In the container holder device of the present preferred embodiment, the sliding arm 3 and the angled portion 215, which becomes the fixed arm, form the container receiving hole. However, it may be possible to form the receiving hole just by using sliding arms without using the fixed arm. Furthermore, in the case of the containers such as a paper cup whose outer diameter is reduced toward the bottom thereof, it is not necessarily to provide the cover since the arms alone will support the cup.

Figure 3:
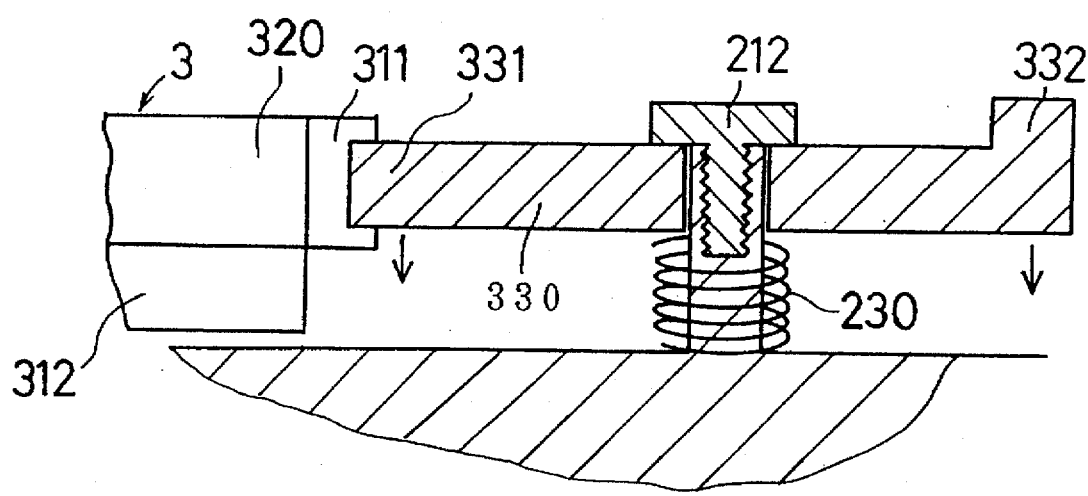
FIG. 3 is an enlarged, partial cross-sectional view showing another example of a sliding arm and a hook of the container holder device.

As substitutes for the above-mentioned arm 32 and the hook 33, as shown in FIG. 3, an arm portion 320 and a hook 330 may be used. This arm portion 320 includes a guiding portion 312 at the lower part of a base portion to which a claw 331 projects. The arm 320 and the arm 32 are the same excluding the point that the arm 320 only includes this guiding portion 321. This hook 330 is provided so as to be able to move relatively to a hook axis 212 in the axial direction. And the hook 330 is biased by an urging spring 230 such that the claw 331 contacts an engaging tooth 311 of the arm 32 of the sliding arm 3.

In this example, by pushing down an operating edge 332 of the hook 330, the entire hook 330 is pushed down, and the claw 331 of the hook 330 comes off from the engaging tooth 311 of the sliding arm 3 so that the sliding arm 3 slides by one action to the direction in which the receiving hole is enlarged by the urging spring (not shown). On the other hand, the claw 331 of the hook 330 which comes-off from the engaging tooth 311 is guided by contacting with the guiding portion 312 disposed downward thereof. At the position to which the sliding arm 3 slides, the engaging tooth 311 does not exist. Therefore, when the operating edge 332 is released stopping the pushing pressure of the operating edge, the hook 330 moves by the urging force of the urging spring 230. Owing to this, the claw 331 returns to the position in which it can engage to the engaging tooth 311 again. Namely, by sliding the sliding arm to the direction to which the receiving hole is reduced and by releasing the sliding arm 3 there, the claw 331 of the hook 330 engages to the engaging tooth 311 so that the sliding arm 3 is fixed.

As mentioned above, by adopting the arm portion 320 and the hook 330 shown in FIG. 3, the sliding arm 3 can be moved by one action in the direction to which the receiving hole is enlarged only by pushing the operating edge 332.

Having now fully described the present invention, it will be apparent to one of ordinary skill in the art that many changes and modifications can be made thereto without departing from the spirit or scope of the present invention as set forth herein including the appended claims.

I claim:

1. A container holder device comprising:
   a case which is installed in a body of a vehicle, said case having a pair of generally vertical side walls defining a part of a storage chamber;
   a base which is pivotally supported by said case so as to be movable between a stored position and a use position;
   at least one movable arm having one end supported by said base so as to be movable with respect to said base to contact a periphery of a container when said base and said at least one arm are in said use position, said at least one arm being guided to move from an outside to an inside of at least one of said side walls upon movement of said base from said use position to said stored position so that said at least one arm contacts said at least one side wall in said storage position; and urging means for urging said at least one arm toward the outside of said at least one side wall.

2. A container holder device according to claim 1, wherein said base includes a fixed arm which is constructed and arranged to contact outer peripheral portion of said container so that the periphery of said container is secured by cooperation of said fixed arm and said at least one sliding arm.

3. A container holder according to claim 1, wherein two movable arms are provided to hold a pair of containers, said arms being guided to move from an outside to an inside of said side walls and contacting the side walls in said stored position.

4. A container holder device according to claim 3, wherein said base includes arm movement regulation means for regulating an amount of movement of said sliding arms so as to adjust for various sized containers.

5. A container holder device according to claim 4, wherein said arm movement regulation means comprises engaging teeth provided at each of said sliding arms and a hook which engages associated engaging teeth.

6. A container holder device according to claim 3, further comprising a cover coupled to said case and movable between opened and closed positions, said cover covering said base and said sliding arms in its closed position thereby storing said base and said arms in said storing position, said cover being a pedestal for said container when said cover is in its opened position.

7. A container holder device according to claim 1, wherein said two side walls are disposed at opposing edges of said case and two movable arms are provided, each of said arm being guided by making contact with a respective said side wall, respectively.

8. A container holder device according to claim 7, wherein said base includes one fixed arm which is constructed and arranged to make contact with an outer periphery of said container and is disposed between said two movable arms so that together with each of said arms, peripheries of two containers may be secured.

9. A container holder device comprising:

a case which is constructed and arranged to be installed in a body of a vehicle, said case having a pair of generally vertical side walls defining a part of a storage chamber;

a base which is pivotally supported by said case so as to be movable between a stored position and a use position;

at least one movable arm having one end supported by said base so as to be movable with respect to said base to contact a periphery of a container when said base and said at least one arm are in said use position, said at least one arm being guided to move from an outside to an inside of at least one of said side walls upon movement of said base from said use position to said stored position so that said at least one arm contacts said at least one wall in said storage position; and urging means for urging said at least one arm toward the outside of said at least one side wall.

* * * * *